(No Model.)
W. E. LINK.
DETACHABLE COUPLING.
No. 334,256. Patented Jan. 12, 1886.
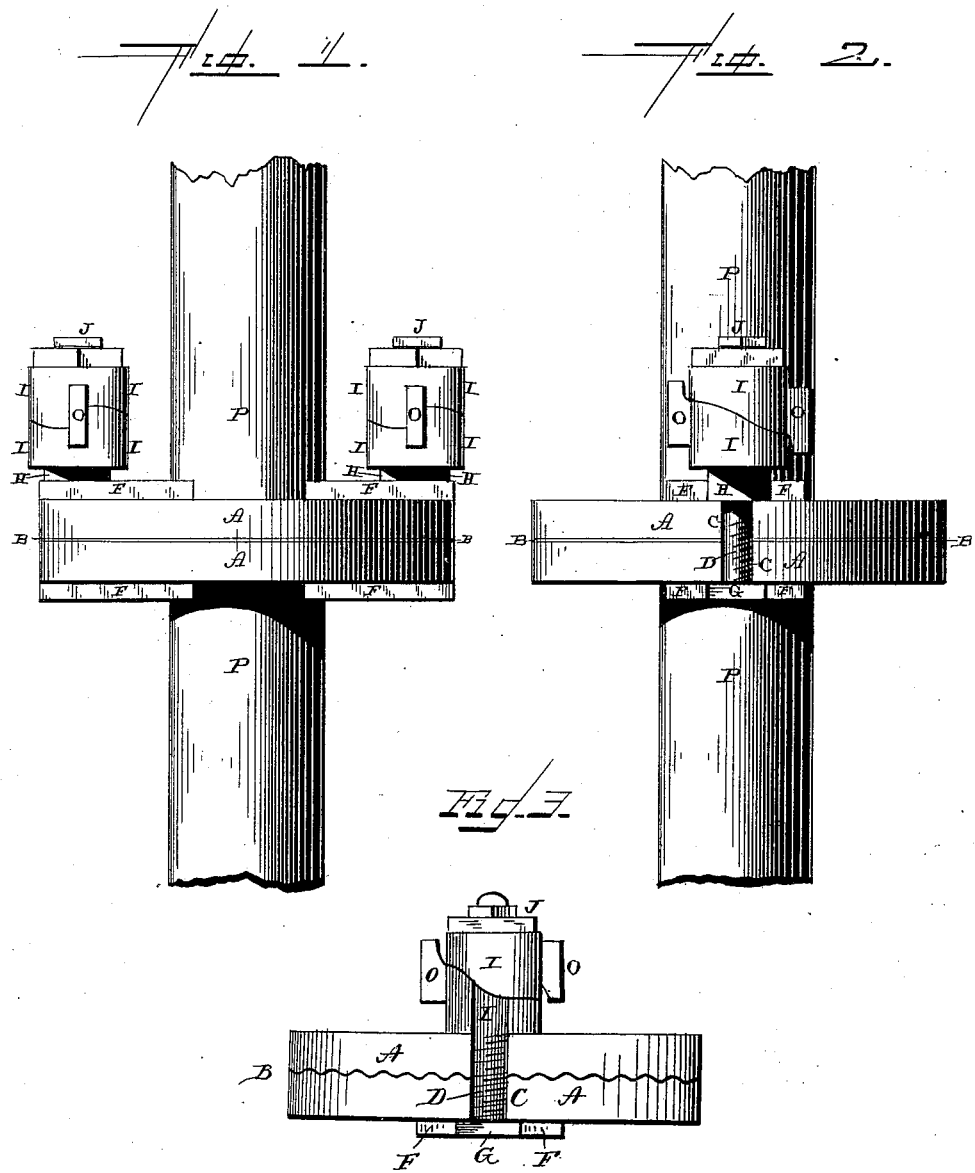

United States Patent Office.

WILLIS EUGENE LINK, OF RADCLIFFE, IOWA.

DETACHABLE COUPLING.

SPECIFICATION forming part of Letters Patent No. 334,256, dated January 12, 1886.

Application filed August 13, 1885. Serial No. 174,353. (No model.)

*To all whom it may concern:*

Be it known that I, WILLIS E. LINK, of Radcliffe, in the county of Hardin and State of Iowa, have invented certain new and useful Improvements in Detachable Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in detachable couplings; and it consists in the combination of two flanges or plates having a suitable number of radial slots with clamping-bolts which are passed through the slots, and cams which are applied to the bolts for the purpose of clamping the two flanges tightly together, as will be more fully described hereinafter.

The object of my invention is to provide a coupling between sections of wooden tubing or between iron and wooden tubing, or for coupling pipes of different kinds together, and in which the two parts of the coupling can be quickly and readily put together or detached from each other, as may be desired.

Figure 1 is a side elevation of a coupling embodying my invention. Fig. 2 is a similar view taken at right angles to Fig. 1. Fig. 3 shows a modification.

A represents flat round plates or flanges having openings through their centers, and which are perfectly smooth upon their inner sides. When brought together, a packing of leather, rubber, or other suitable material, B, is placed between them. In each plate or flange are made a suitable number of radial slots, C, which slots register when the two plates or flanges are brought together, and through which the clamping-bolts D pass. Upon each side of each one of the slots are made the ribs F, which serve to catch against opposite sides of the head G of the clamping-bolt and against the square portion H, which is formed on each one of the cams I. The ribs upon one of the plates or flanges catch against opposite sides of the head of the bolt, so as to prevent the bolt from turning when the nut J is being tightened into place. The inner cam has its square portion to catch between the two ribs upon the other plate or flange, so that this cam is prevented from turning around upon the bolt when the other cam is being turned for the purpose of clamping the plates or flanges rigidly together.

Each one of the cams is shaped as shown upon its lower edge, and when the outer one of the two cams is turned by means of the projection O, which is formed upon its side, the inclined surfaces are made to act as wedges, and thus exert a pressure against the nut on the end of each bolt, and thus draw the two plates or flanges tightly together. Each one of the slots in the plate being open at its outer end, it is only necessary to move the cam into that position where their inclined surfaces exert no pressure against each other, and then each bolt can be pulled freely out of its slot.

When the flanges or plates are first placed together, the nuts are adjusted upon the bolts in any desired relation to the outer ends of the outer cam, and then the flanges or plates are clamped together by turning the cams partially around.

Each plate or flange has a pipe, P, of suitable length, projecting from its center, and these pipes are either to be connected by suitable screw-couplings to the iron pipe or the pipes P are to be driven into the wooden tubings. The friction of the tubing against the pipes P will be sufficient to hold the parts in position; but if it is so desired the plates or flanges can be secured to the wooden tubing by means of screws or any other suitable devices.

By means of a coupling constructed as here shown and described pipes of iron and sections of wooden tubing can be quickly put together and taken apart. This coupling can also be used for connecting iron pipes together; but it is more especially intended for connecting together the sections of the tubing used in connection with pumps.

As each end of the outer or upper cam has a square end, it can be turned in either direction by a wrench, instead of by a projection, O, as shown. The projections O, being placed one upon one cam and one upon the other, serve also to prevent the upper cam from being turned too far around.

Instead of having the inner surface of the plate A made smooth, it may be ribbed or roughened in any suitable manner. If so preferred, the inner or lower cam may be cast as a part of the plate or flange A, in which case there will be no necessity for the ribs F on the upper surface of the flanges.

In case the nut rusts upon the bolt, so that it cannot be turned, the cams will allow the bolts to be removed without the slightest trouble, and that without damaging any part of the coupling or any loss of time.

Having thus described my invention, I claim—

1. The combination of the plates or flanges provided with slots and ribs upon opposite sides of the slots with the clamping-bolts, the cams, and the nuts which are applied to the bolts, substantially as set forth.

2. The combination of the plates provided with pipes at their centers, slots through their edges, clamping-bolts, cams placed upon the bolts and provided with projections, and the nuts upon the bolts, substantially as specified.

In testimony whereof I affix my signature in presence of two witnesses.

WILLIS EUGENE LINK.

Witnesses:
A. J. HARRIS,
C. O. BUTLER.